Jan. 15, 1957          D. McDONALD          2,777,285

SYSTEM, METHOD AND APPARATUS FOR CLOSED CYCLE CONTROL

Filed May 15, 1952          3 Sheets-Sheet 1

INVENTOR.
Donald McDonald.
BY

INVENTOR.
Donald McDonald.
BY
Thiess, Olsen + Mecklenburger.
Attys.

2,777,285

SYSTEM, METHOD AND APPARATUS FOR CLOSED CYCLE CONTROL

Donald McDonald, Skokie, Ill., assignor to Cook Electric Company, Chicago, Ill., a corporation of Illinois Application May 15, 1952, Serial No. 287,955

33 Claims. (Cl. 60—6)

This invention relates to a system, method and apparatus for closed cycle control, and more particularly to a nonlinear system, method and apparatus for closed cycle control.

It is a principal object of this invention to provide improved control of closed cycle follow-up apparatus.

It is a further object of this invention to provide an improved system for such closed cycle control whereby optimum agreement will be maintained at all times between a controlling and controlled element.

It is often desirable to control the position of a large mass without providing the necessary motive power to move the mass from a controlling element. An example of this type of operation is in the use of gun directors for the control of gun mounts weighing many tons. Here it is obviously impossible for a delicate electronic instrument or a human operator to provide the power necessary to rapidly and accurately follow a moving target. Therefore, a signal voltage is generated which is characteristic of the path of the moving target. This is done by following such a target with a controlling element adapted to generate a voltage corresponding either to its absolute position or its position relative to the controlled element. This characteristic voltage is then appropriately amplified and applied to a prime mover which, in turn, drives the gun mount. This type of control is herein referred to as linear or continuous control. If the characteristic voltage is applied to switch means to control the direction of a large prime mover, the system is of the contactor or on-off type of control.

Extensive effort has been expended in an attempt to create devices which will cause the controlled element to precisely follow the same pattern as the controlling element and do so simultaneously. All such systems heretofore known have exhibited one or more characteristic faults detrimental to satisfactory operation. In the case of continuous controls, that is, where a signal characteristic of positional displacement or error is generated and amplified and then applied to a prime mover, there will always be a steady-state error necessary to generate a controlling signal. Additionally, the response time of such a system, that is, the lag of the controlled element for a quick positional change of the controlling element, is generally relatively long as a result of the lower torque which is applied in continuous mode operation resulting from the use of only a relatively small torque which is proportional to positional displacement at any given time.

In the second type of controller wherein the error signal is used to switch from positive to negative full torque, the response of the system is much more rapid. However, in such a system full torque is always applied to the controlled element, and consequently, the system is characterized by intermittent sporadic motion, generally characterized in the art as "hunting."

Thus a control system, using linear continuous mode operation as heretofore known, has been characterized by poor response time and consequent lag of the controlled element during rapid tracking. The contactor type of apparatus has been characterized by inaccurate motion and hunting, which results from the application of full torque to the controlled element for all magnitudes of displacement.

While it is desirable to have the accurate tracking characteristic of linear controls when there is substantial positional agreement between the controlling and controlled elements, it is desirable to apply full torque in the desired direction for large positional discrepancies in order to reduce said discrepancy within the minimum time.

Therefore it is an additional object of this invention to provide a system of positional control in which the controlling force is a nonlinear function of the error between the controlled and controlling elements.

It is an additional object of this invention to provide a system of multiple mode operation in which the apparatus will be controlled in a linear or continuous mode for small errors, and will be controlled as an on-off or contactor system for relatively large errors.

It is another object of this invention to provide a system which will reduce step functions of error or error rate to zero in the quickest possible time for a system having limited torque.

It is a further object of this invention to reduce the weight and complexity of the required controls, amplifier and power converter normally required in closed cycle control systems.

It is another object of this invention to provide a system in which a torque is developed for small errors in a continuous mode in which the control voltage is a continuous and single-valued function of positional difference or error $E$, of input position $A_i$, and output position $A_o$, and their derivatives and integrals, and to provide full torque at predetermined times when a function of the error exceeds a predetermined value in order to reduce the error in the minimum possible time.

It is a further object of this invention to provide a method and apparatus to reverse the maximum torque at such a time that the error and rate of change of error or error rate will be reduced to zero coincidentally.

Further and additional objects of this invention will become manifest from the specification, accompanying drawings and appended claims.

In carrying out this invention in one form a closed cycle control system is provided which will control the angular position of a rotating output shaft in response to the angular position of a rotatable input or signal shaft. This type of closed cycle control is generally referred to as a servomechanism, and will hereinafter be referred to as a servo.

More particularly, one form of this invention comprises a motive means and a load, a controlling shaft or input, a means for comparing the angular position of the load and the input and for generating an error voltage proportional to the angular difference or error, a continuous mode torque computer which will amplify the error signal and apply a function of error $E$, input position $A_i$, output position $A_o$, and any desired derivatives or integrals of these functions to the motive means, an electronic computer, a control actuated by the output of the computer to apply the output of such a continuous torque computer to the motor in order to drive the load when the input and output are in substantial agreement and to switch to a source of maximum torque whenever an output-input error function is of a predetermined magnitude, and a second control actuated by the computer output to reverse the polarity of said maximum torque at such a time that the error $E$ and error rate $\dot{E}$ will go to zero substantially simultaneously.

The invention herein described is of much broader scope than it is possible to set out in one particular apparatus, and it should be clear that the above-described form and the embodiments hereinafter described are merely exemplary of several of the physical forms which can be derived from the new concepts which are intended to be encompassed by the specification and claims.

For a more complete understanding of this invention reference should now be made to the accompanying drawings, wherein.

Figure 1:
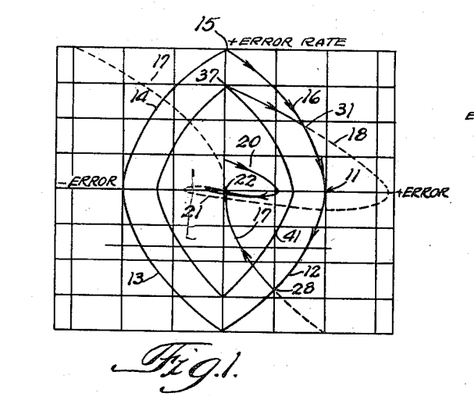
Figure 1 is a phase plane diagram illustrating the operation of one embodiment of this invention.

Referring now to the drawings, and more particularly to Fig. 1, a phase plane diagram for typical servo operation is illustrated. In this phase plane diagram the error $E$ is plotted along the abscissa and error rate $\dot{E}$ is plotted on the ordinate. A phase plane diagram thus plotted is an accurate representation of the dynamic relationships between two elements and can be accurately plotted without any consideration of time. Thus in Fig. 1, if an original step function of positive error exists in a given system, the phase plane representation of that system with a step function of error would be at point 11.

In the contactor mode of operation, the maximum negative torque would then be applied to the controlled element according to the equations (1) $$J\ddot{E} = -T_m \quad E > 0$$
$$J\ddot{E} = T_m \quad E < 0$$

where $J$ is the combined moment of inertia of the motor and load, $\ddot{E}$ is the acceleration of the error $E$, and $T_m$ is the full torque of the servo motor. From these equations it can be seen that a positive error would produce a negative error acceleration $\ddot{E}$ which would cause a negative error rate with a consequent reduction of positive error. Thus the phase plane portrait of the system would follow line 12, indicating a reduction of positive error $E$ with a consequent increase of negative error rate $\dot{E}$. All practical systems will have some maximum torque limit or torque saturation and this is the principal reason that no system can be built which will follow in perfect correlation at all times. The exact character of this curve 12 approaches a parabola and is determined, first, by the magnitude of the step-function of error and, second, by the torque to inertia ratio $T/J$, according to the general equation (2) $$\dot{E}^2 + 2T/_J E = 2T/_J E_1$$

where $\dot{E}$ is the error rate, $E$ the corresponding error at any time, and $E_1$ the step-function of error shown at point 11. This equation is accurate only in systems wherein the viscous and coulomb friction are small enough relative to the inertia that they may be ignored. In a system having substantial frictional forces, a different equation would apply, but the teaching of this invention would be equally applicable thereto, differing only in the non-linear computer elements which are used to synthesize a voltage corresponding to this equation.

In the contractor mode of operation the phase plane portrait, upon reaching the ordinate, will undergo a sudden torque reversal in accordance with Equation 1. A rapid change of phase plane portrait slope will result from torque reversal, and the portrait will then follow curve 13 to reduce the error rate to zero while at the same time a negative error resulting from the negative error rate is introduced into the system.

Again, according to Equation 2 but with the sign of $T$ and $E_1$ changed, the shape of the portrait in the second and third quadrants will be substantially parabolic also. This is true only in a system in which the various damping forces, such as friction, are negligible, which has been found by experiment to be often true. The exact character of this curve can be experimentally determined readily by applying full torque to any motor and load and rapidly reversing the torque. A voltage which is proportional to error, which may here be its absolute position, is then applied to the horizontal deflection plates of an oscilloscope and the same voltage applied through a differentiating network to the vertical plates of said oscilloscope. By analyzing or photographing the resulting oscilloscope trace an approximate equation of the curve can be derived which is an accurate function representing all of the forces acting upon the system and the resulting phase plane trajectory. This might be substantially parabolic, or logarithmic or of any other arbitrary shape.

In such full torque operation the load would be continuously accelerated following curve 14 until the negative error is again reduced to zero at point 15, at which time the system will again undergo torque reversal according to Equation 1 and follow curve 16 back to point 11. Thus if the frictional forces are negligible in any given system, a contactor type of control system with a step-function error would cause continuous oscillations about this closed portrait defined by curves 12, 13, 14 and 16.

As it is desirable to reduce both error and error rates to zero simultaneously, curve 13 may be advantageously shifted and plotted from the origin to the intersection of curve 12, and this curve 17 represents the phase plane trajectory of a system designed to reduce $E$ to $\dot{E}$ to zero coincidentally. From Equation 2 with $E_1$, the step-function of error, equal to zero, the curve through the origin is represented by the equation (3) $$|\dot{E}|\dot{E} + 2T/_J E = 0$$

By constructing a system wherein the torque applied to a load is reversed when the phase plane portrait 12 intersects the torque reversal curve 17, the system would, instead of continuing along curve 12 to the ordinate, follow curve 17 to the origin where, theoretically, the system would be maintained in positional agreement as long as steady-state conditions prevailed.

In the various embodiments of this invention a torque polarity computer portion is provided whereby a voltage proportional to the function on the left-hand side of Equation 3 is synthesized from an error signal input. This torque polarity computer output is used to energize a saturation torque switch to determine the direction of applied torque to the load. When the output voltage of the computer approaches zero, torque reversal is desired so that the system will follow curve 17, and this can readily be accomplished by applying the computer output to any electrically sensitive switching device. While these curves are shown as perfectly smooth, and the changes in trajectory are shown as instantaneous, an actual system will require a short period of response for switching and torque reversal, but this may easily be compensated for in the adjustment of the switch mechanism and computer.

Linear mode operation is represented in Fig. 1 by curves 18 and 20. The torque applied to the output in linear operation is generally represented by the following equation:

$$(4) \quad T_c = KE + 1\dot{E} = -J\ddot{E}$$

where $K$ is the controller gain of the system and $1$ is the error rate damping coefficient. This is just one possible linear system, and it should be understood that the teaching of this invention would be equally applicable to any system using a continuous torque proportional to any combination of $E$, $A_i$, $A_o$ and any integrals or derivatives of these functions.

It can be seen from this equation that the maximum torque, and consequently maximum acceleration of the load, is not normally utilized unless the error $E$ or error rate $\dot{E}$ is of such magnitude that $T_c$ is equal to $T_m$, the maximum available torque from the prime mover. Thus, for linear operation the slope of curves 18 and 20, which is a function of torque, will not be as great as that of the maximum torque curve 16. For any given error rate step-function, therefore, a larger error will be introduced into a linear system before the error rate is reduced to zero.

Additionally, the maximum negative error rate utilized to bring the phase plane portrait to the origin will never be as large as that represented by curve 12. The ideal servo having limited torque would accelerate negatively at its maximum rate until such a time that positive acceleration at the maximum rate will cause the portrait to go through the origin. In a linear system this is not true, as upon the portrait crossing the abscissa, the sign of the controller voltage resulting from error $E$ and that resulting from the error rate $\dot{E}$ are of opposite polarity, and thus the controller torque will gradually approach zero as the magnitude of the function $KE$ approaches the value of the function $1\dot{E}$, and at that point torque reversal is effected and a voltage will be applied to the prime mover which will accelerate the load in an attempt to effect error and error rate agreement coincidentally.

In a system which is slightly underdamped the portrait will not immediately go to the origin but will overshoot as shown by curve 21, and will hunt about the origin approaching it in a logarithmic spiral. The trajectory of a critically damped system would approach the origin 22 and remain in proximity thereto for near steady-state conditions. Slightly underdamped linear operation in steady-state is ideally suited for accurate tracking, but as can be seen from the portrait is not well adapted for correction of large step functions. Conversely, contactor operation is well suited for large step-function correction but is poorly adapted for accurate control under near steady-state conditions. Therefore, the system provided by this invention utilizes contactor type of operation for large functions of error and error rate, and provides linear mode operation for small functions of error and error rate.

Figure 2:
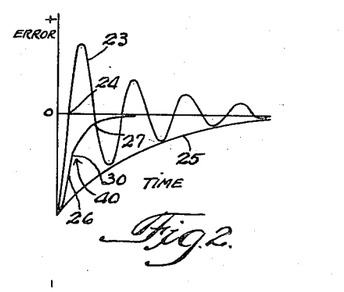
Fig. 2 is a time response plot illustrating the advantages of dual mode operation.

The advantages of this type of operation are illustrated in Fig. 2 where the time response for a given combined step-function of error and error rate is illustrated for three types of operation. Curve 23 represents contactor type of operation with some output damping, and shows that for a given negative error the system is rapidly reduced to positional agreement as at point 24, but is carried on by its inertia to a large positive error before the reversed torque can bring the error rate to zero and then accelerate in the opposite direction. Curve 25 illustrates the time response of a critically damped linear system and shows that while the curve never crosses the abscissa, hence no hunting, the approach to it is extremely slow. Curve 40 illustrates dual mode operation taught by this invention and shows that initially linear operation causes relatively slow error correction for a short period of time, introducing a predetermined error. A boundary computer then switches automatically to contactor or full torque operation, wherein curve portion 26 is substantially parallel to contactor mode curve 23. These curves remain parallel until curve 40 approaches the origin, at which time a system utilizing this invention will have reversed its maximum torque, as at point 30, to approach error and error rate agreement simultaneously and will, when the system is within a predetermined area about the origin, as at point 27, revert to linear mode operation to give accurate positional control. Such a dual mode system will correct step-functions of error in a fraction of the time heretofore required for any known system. While the switching technique of a multiple mode system is here described, this invention contemplates and includes within its scope the use of nonlinear elements in the torque computer portions which would result in full torque outside of a predetermined area about the origin of the phase plane and substantially linear control within said area. The switching system herein described is preferred as it results in a substantial reduction in the weight and complexity of the amplifying equipment.

A system using this dual mode concept possesses great simplicity of construction and reduction of weight, as saturation torque is never developed while the system is in the linear or continuous torque mode. Thus the amplifier and converter portions of the system adapted for use in the continuous mode do not have to be built to handle the maximum torque requirements of the system. Further, extremely powerful prime movers and positive clutch mechanisms can be used with this apparatus while such devices would have been totally impractical with linear systems heretofore known.

Figure 3:
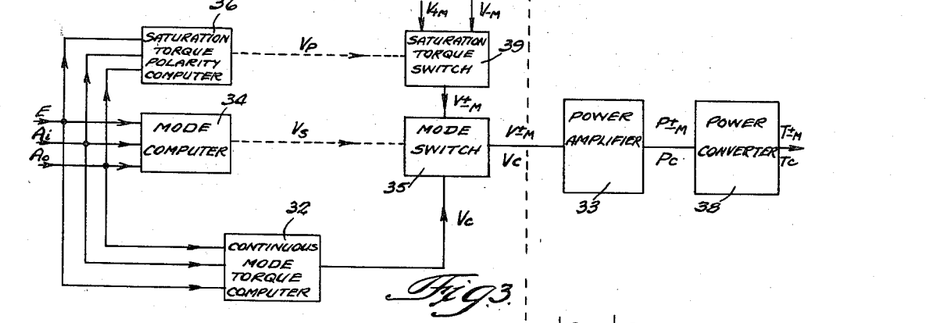
Fig. 3 is a block diagram illustrating one embodiment of this invention.

Fig. 3 illustrates an embodiment of this invention which utilizes a single power amplifier and power converter which would be of the customary type used in any linear mode servo. In this embodiment three inputs are shown which represent error $E$, input position $A_i$ and output position $A_o$. These three inputs are applied through appropriate conductors to a continuous mode torque computer 32 which may control the power amplifier 33 as any desired function of error, input position, output position or any integrals or derivatives of these functions, as is well known in the linear servo art. Additionally, these three inputs are applied to the mode computer 34 which will compute from the error $E$, the function represented by the left-hand side of Equation 1 or any other desired mode boundary. When the output of the mode computer reaches a predetermined value, that output $V_s$ which is applied to the mode switch 35 will cause that switch to remove the output $V_c$ of the continuous mode torque computer and apply the output $V_{\pm m}$ of the saturation torque switch 39 to the power amplifier 33. While this particular mode computer establishes the parabola 16 as its boundary, any appropriate function of $\dot{E}$, $E$ or a combination thereof might be utilized. The advantage of this mode boundary is that for any step-function the trajectory will be the same and will coincide with the boundary. The input is also applied to the saturation torque polarity computer wherein a voltage is generated which represents the function $\dot{E}|\dot{E}| + 2T/jE$, which is the left-hand side of Equation 3. This function represents the torque reversal curve 17 of Fig. 1, which, it should be understood, is just one of many possible curves, the exact curve being determined by the nature of the system. When this function becomes zero the Equation 3 is satisfied, which indicates that the system is intersecting the torque reversal curve 17 of Fig. 1. At this point the output voltage $V_p$ of the saturation torque polarity computer 36 will be zero and will cause the saturation torque switch 39 to be deenergized, thus switching from $V_{-m}$ to $V_{+m}$. In most practical systems, the switch will sense the sign of the output of the torque polarity computer and the switching will be based on a sign reversal. One manner in which this system operates is then as follows:

Upon the insertion of a step-function of error rate into the system, such as indicated at point 37 in Fig. 1, the mode switch is in such a position that $V_c$, the output of the continuous mode torque computer 32, is applied to the power amplifier 33 through the mode switch 35. The output $P_c$ of the power amplifier 33 is thus proportional to a linear function of the error and is applied to the power converter 38 which may be any appropriate motive means such as an A. C. two-phase motor. The output torque of such a motor is then proportional to the function of the error as represented by the output $V_c$ of the continuous mode torque computer 32 and is used to drive any load which is to be controlled.

While the description herein is usually directed to positive errors and consequently torque reversal in the fourth quadrant, it should be obvious that the torque reversal curve also extends into the second quadrant and the system functions equally well along that curve.

When the phase plane portrait intersects curve 16 at point 31 the mode computer output $V_s$ is equal to the constant represented by the right-hand side of Equation 2, $2T/jE_1$. This output voltage will energize the mode switch 35 to apply the full negative output $V_{-m}$ of the saturation torque switch 39 to the power amplifier 33 which will result in full negative torque from the power converter 38 and will cause the phase plane portrait of the system to follow the curves 16 and 12, as indicated by the arrows in Fig. 1. For optimum response time, the mode switch 35 will be so adjusted that the maximum value that $V_c$ can attain before switching will be a small fraction of the full torque voltage $V_{\pm m}$.

As the phase plane portrait approaches point 28 the output $V_p$ of the saturation torque polarity computer 36 will approach zero and will cause the saturation torque switch 39 to be deenergized, switching to $V_{+m}$ which will be applied through the mode switch 35 to power amplifier 33. This will, in turn, result in a maximum positive torque from the power converter 38 and will cause the system to follow along the torque reversal curve 17, as indicated by the arrow.

The mode switch 35 is chosen with an appropriate hysteresis, a desirable characteristic whereby operation will not revert to the linear mode, although the phase plane portrait is following curve 17 within the mode boundary. This switch hysteresis will provide a predetermined time lag in switching whereby the mode switch will be deenergized and the output of the continuous mode computer 32 will be once again applied to the power amplifier 33 upon the trajectories intersecting a second parabola 41. The continuous mode operation is provided to reduce both error and error rate to substantially zero even though the application of the saturation torque has not been such that the system is accurately following the torque reversal curve 17 to the orgin. This is desirable to provide stability in the region of the origin.

Figure 4:
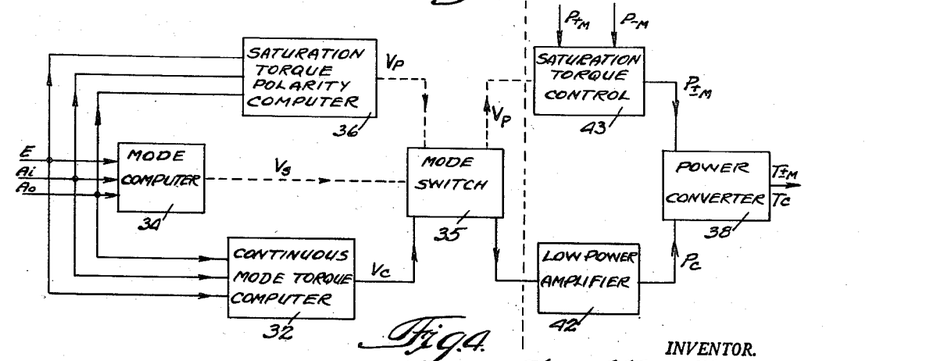
Fig. 4 illustrates a block diagram of a second embodiment which includes a low power amplifier.

The dual mode system shown in Fig. 4 operates in a manner similar to the embodiment of Fig. 3, but includes a power amplifier 42 having a maximum output which is a small fraction of that of amplifier 33. This is accomplished by utilizing a double-pole three-position relay 43 as a saturation torque control adapted to supply the full power required for maximum torque for the power converter 38 during saturation torque operation. The saturation torque control 43 will apply a predetermined voltage directly to the power converter which substantially reduces the maximum power requirements of the power amplifier. The low power amplifier 42 is here required to provide only relatively low power for the low torque requirement of continuous mode operation, while in the embodiment of Fig. 3 the power amplifier 33 must be capable of handling the power necessary for full torque operation.

The system of Fig. 4, therefore, functions as follows: In normal operation with the input and output in substantial positional agreement, the continuous mode torque computer 32 will apply a voltage $V_c$ proportional to a function of the error E to the low power amplifier 42 through the mode switch 35. The mode computer 34 determines the maximum error function for continuous mode operation and generates a voltage $V_s$ representative of that function which controls the mode switch 35. Mode switch 35 will be energized when said function reaches a predetermined magnitude. The mode switching will take place for values of error-function such that the low power amplifier 42 will be required to supply an output $P_c$ which is substantially less than the maximum power $P_{\pm m}$ which will be available from the double-pole three-position relay 43. This provides for a great conservation of weight and complexity in the construction of the power amplifier 42, and to this extent is an improvement over the embodiment taught in Fig. 3. The saturation torque polarity computer 36 operates in this embodiment in the same manner as that described above, and upon the output of this computer going through zero, the double-pole three-position relay 43 is energized and its output will switch from maximum negative power $P_{-m}$ to maximum position power $P_{+m}$ when the system is in the fourth quadrant of the phase plane diagram.

The dual mode system taught in Fig. 5 again utilizes a computing and control switching section identical with that employed in the embodiment of Fig. 4. It utilizes a mode computer 34 which determines whether the output of the continuous mode computer 32 or the saturation torque polarity computer 36 is utilized at the output of mode switch 35. However, in this embodiment the low power amplifier 42, which is energized by the output of the continuous mode computer 32, is applied to a low power motor 44. This prime mover is not capable or required to provide the maximum torque which the system is designed to utilize. The output of the low power motor 44 may be attached to the load directly or it may be applied to the load through an overrun clutch, whereby if the load is being driven at a rate in excess of that indicated by the continuous mode computer 32, the clutch will slip or overrun and the low power motor 44 will have no effect upon the system.

Figure 5:
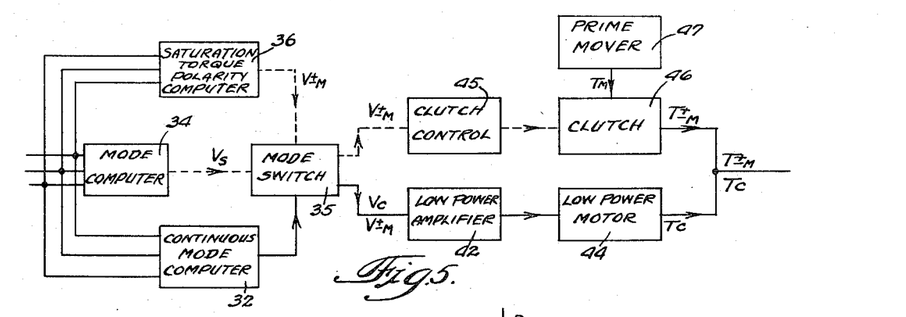
Fig. 5 illustrates a block diagram of a third embodiment utilizing a clutch control of a high torque prime mover.

The output $V_s$ of the mode computer 34 which controls the mode switch 35 will cause $V_c$ to be removed from the low power amplifier when the system reaches the mode boundary of Fig. 1, and will apply a maximum voltage $V_{\pm m}$ to produce the maximum torque of the low power motor 44 and energize the clutch control 45 with the output of the saturation torque polarity computer 36. Clutch control 45 will cause a reversible constant torque clutch 46 to be energized to engage the prime mover 47 which applies a predetermined maximum torque to the load through clutch 46. The direction in which the torque of prime mover 47 is applied will be determined by the polarity of the output of the saturation polarity computer 36, and will be such that automatic torque reversal by clutch 46 will be effected when the phase plane portrait of the system crosses torque reversal curve 17 of Fig. 1.

The advantage of this system over that of Fig. 4 and Fig. 3 is that a large prime mover 47 is provided which requires no continuous control but will be operating in the same direction from a fixed voltage at all times. Meanwhile, a low power motor 44 is provided which can have less mass and consequently lower inertia than either of the power converters described above, and therefore can be controlled more accurately for a system in near steady-state operation.

Figure 6:
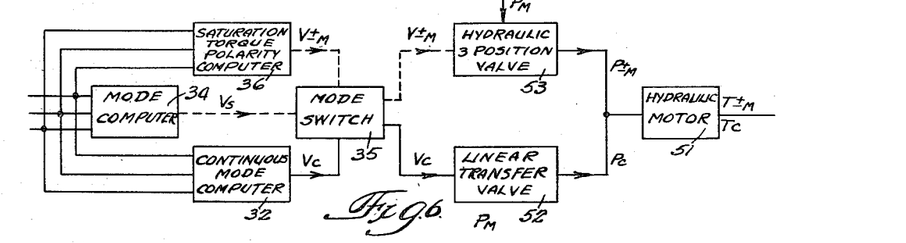
Fig. 6 illustrates a block diagram of a hydraulic embodiment of this invention.

A hydraulic system is illustrated in Fig. 6 which employs the nonlinear operation concept of this invention. In this embodiment the computing and control switching section is identical with that shown in Figs. 3, 4, and 5, but instead of controlling an electrical power converter or clutch mechanism, two hydraulic valves are provided to control fluid flow to an appropriate hydraulic motor 51. Linear transfer valve 52 has a very small fluid capacity relative to the maximum possible flow for which the hydraulic motor 51 is designed. During near steady-state operation the continuous mode computer 32 applies a voltage $V_c$ through the mode switch 35 to linear transfer valve 52, so that the valve is opened to provide an orifice having a size proportional to the magnitude of the control voltage $V_c$. The output of this valve in turn drives hydraulic motor 51 to provide a torque also proportional to the magnitude of $V_c$. When the function of the error, its derivatives and integrals reaches a predetermined magnitude, the mode computer 34 energizes the mode switch 35 and causes the linear transfer valve to assume a closed or wide open position, and energizes the three-position valve 53 with a voltage such that a large fluid flow, the maximum for which the system is designed, causes the hydraulic motor 51 to exert its maximum design torque. The direction in which this torque is applied is determined by the saturation polarity computer 36 which applies an appropriate voltage through mode switch 35 to the three-position valve 53. Valve 53 may be of any common three-position type, preferably one which is substantially self-actuating and will quickly and positively provide quick response in the system. The three positions will correspond to a neutral position which is assumed during continuous mode operation, a full positive torque position, and a full negative torque position. The low range of operation of the linear valve 52 yields extremely accurate control in the linear mode, as the ability of any such valve to be controlled in small increments is a direct function of the maximum available output or orifice size.

Figure 7:
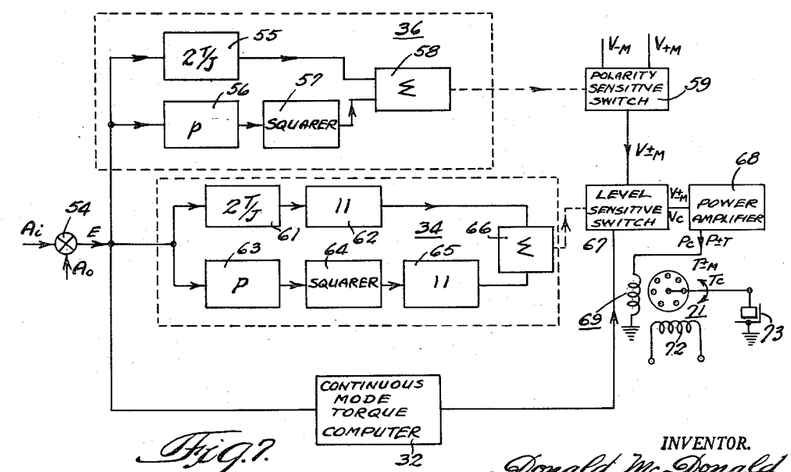
Fig. 7 is a block diagram of the saturation torque polarity computer and mode computer of Fig. 3.

Fig. 7 shows in block form the mode computer 34 and the saturation polarity computer 36 which could be appropriately utilized in any of the four embodiments of this invention disclosed above, or in various other embodiments which might be conceived and which would clearly fall within the concept and scope of this invention.

In Fig. 7 the output position $A_o$ and input position $A_i$ are registered in a differential 54 which will generate a voltage proportional to the error E, i. e., the angular difference $A_i - A_o$. This error is applied as is shown in the block diagrams above to the saturation polarity computer 36, the mode computer 34, and the continuous mode torque computer 32. In the saturation torque polarity computer 36 the error voltage is applied to an electrical circuit 55 which will produce a voltage at its output proportional to $2T/_JE$. The error voltage is also applied to a differentiating network 56 the output of which is proportional to $\dot{E}$. This voltage proportional to $\dot{E}$ energizes a squaring circuit 57 the output of which is proportional to the square of the error rate with the sign retained, $\dot{E}|\dot{E}|$. The outputs of squaring circuit 57 and amplifier 55 are applied to a summing circuit 58 in which these voltages are arithmetically added to produce an output from the summing circuit 58 which is equal to $\dot{E}|\dot{E}|+2T/_JE$. This is the saturation polarity computer output and it is applied to the polarity-sensitive switch 59 and will determine the polarity of the voltage which is applied to the motive means when in the saturation torque mode. From Equation 3 it is seen that switching will take place when this voltage is zero, which corresponds to any point on the torque reversal curve 17 of Fig. 1.

The error voltage E is also applied to the mode computer 34. Within the mode computer 34 the error voltage is applied to a linear amplifier 61 which produces an output proportional to $2T/_JE$ and this output is applied to a circuit 62 which will produce the absolute value of the output of circuit 61, $|2T/_JE|$. The error voltage is also applied to a differentiating network 63 to produce a voltage proportional to the error rate $\dot{E}$ which is in turn applied to a squaring circuit 64 to produce at its output a voltage proportional to the square of the error rate with the sign retained, $\dot{E}|\dot{E}|$. This output is applied to a circuit 65 which will produce at its output a voltage representing the absolute value of the squared error rate $|\dot{E}^2|$. The outputs of circuits 62 and 65 are applied to a summing circuit in which these voltages are arithmetically added and the output of circuit 66 will be proportional to $|\dot{E}^2|+|2T/_JE|$. This function represents a family of curves representing the full torque parabolas of the phase plane diagram. This voltage is applied to the level-sensitive switch 67 which will switch from the continuous to the saturation mode for a predetermined voltage of the output of circuit 66. This voltage will determine the area of the phase plane diagram surrounding the origin in which the system is in linear mode operaton. The output of level-sensitive switch 67 is applied to a power amplifier 68 in which an appropriate A. C. voltage would be modulated by the error signal $V_c$ or full voltage $V\pm_m$. This modulated output energizes one field winding 69 of an induction motor 71. The other field winding 72 is continually energized by the appropriate A. C. source. The motor 71, which is one suggested form of the power converter 38 of Figs. 3 and 4, will drive the load 73. The error voltage E is also applied to the continuous mode computer 32 which will generate at its output a voltage proportional to $KE+1\dot{E}$, as described above, and will provide for continuous control of the induction motor 71 while in the linear mode. It will again be clear to one skilled in the art that any linear error function will serve equally well and will be within the scope of this invention.

While the system herein described utilizes only a second order differential equation, the principles of multiple mode operation are equally applicable to higher order terms. The higher order terms are considered as delays in switching, and by the proper choice of the switching and computing networks, the switching and torque reversal are initiated before the system trajectory actually intersects the torque reversal curve 17.

Figures 8, 9:
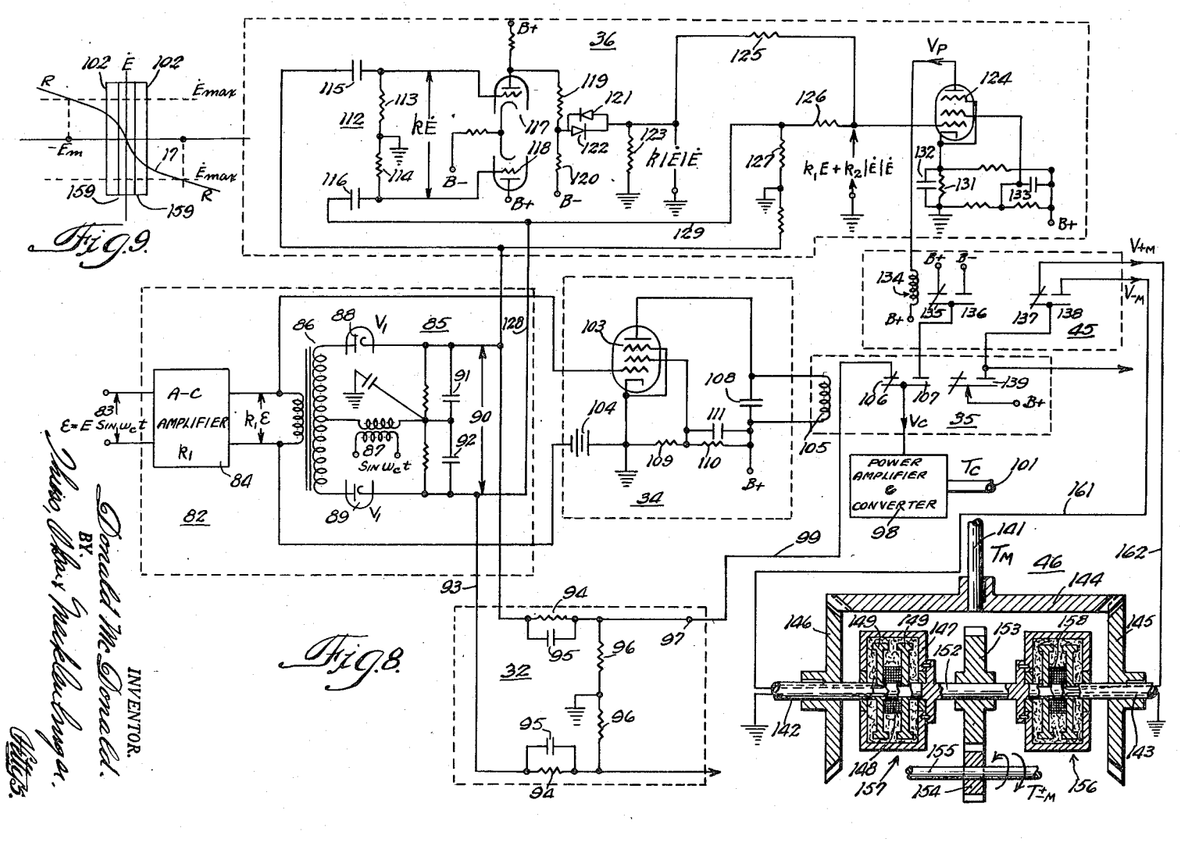
Fig. 8 is a circuit diagram illustrating the computer circuits as employed with the constant torque clutch as shown in block form in Fig. 5.
Fig. 9 is a phase plane diagram of the operation of the circuit of Fig. 8.

The circuit illustrated in Fig. 8 is shown adapted for use with a constant torque clutch 46 and shows the circuit for a saturation torque polarity computer 36, a mode computer 34, and a continuous mode torque computer 32, as is shown in the block diagram of Fig. 5. The outputs of these computers are shown actuating a mode switch 35 and a clutch control switch 45. While this circuit is here shown adapted for use with a constant torque magnetic fluid clutch, it is equally applicable to any servo system using any type of power conversion by a mere adaptation of the mode switch 35 and the saturation torque switch 45. In this circuit a suppressed carrier is utilized for sensing the error, and for that reason an additional block 82 is shown which includes a preamplifier 84 and a demodulator 85. This is not strictly a part of the computing portions of a dual mode system but is only required when using an A. C. carrier in the error-sensing mechanism.

An error voltage is shown at the input terminals 83 of the A. C. amplifier 84, and this voltage is equal to $E \sin W_ct$, where E is the magnitude of error and $\sin W_ct$ represents the instantaneous magnitude of the carrier signal. Here the carrier is the line frequency, but could be any available signal. The advantages of A. C. operation are greater accuracy and stability in the amplifier circuits. A. C. amplifier 84 is a linear amplifier capable of undistorted output and having a band width sufficient to pass the side bands containing the significant rates of change of error. The demodulator 85 is energized by the output of the A. C. amplifier 84 through center-tapped transformer 86. The demodulator 85 is of the conventional phase-sensitive type wherein the suppressed carrier signal to be demodulated is compared with a reference voltage of the carrier frequency. The reference voltage is inserted in the demodulator loop by transformer 87 and the two diodes 88 and 89 act as rectifiers to produce an output from the demodulator which is proportional to the error $\dot{E}$. For the zero signal condition the outputs of the two diodes resulting from transformer 87 are balanced, producing a zero net output at the terminal 90. As the error signal assumes positive values, the voltage of the upper half of transformer 86 adds to that of the upper half of transformer 87 and is out of phase with the voltage induced in the lower half thereof. If the error becomes negative the modulated signal is reversed in phase, $-E \sin Wct$, and will induce voltage in the lower winding of transformer 86 which is in phase with the voltage of transformer 87.

Thus, for positive errors a large voltage is present in the upper loop including diode 88, and for negative errors a large voltage is induced in the lower loop including diode 89. The total voltage between terminals 90 will be proportional to error and of the proper polarity. Condensers 91 and 92 act as filters to remove rectified carrier voltage in the customary manner.

This error voltage is then fed through conductor 93 to the continuous mode torque computer 32 which includes a balanced differentiating network. The network includes a series resistor 94 in parallel with a differentiating condenser 95 and has resistor 96 connected in series therewith to ground. By the proper choice of condenser 95 and resistor 96 an output will appear between ground and terminal 97 of the continuous mode torque computer which will be proportional to the function $KE+1\dot{E}$.

While in this embodiment only the error and error rate are used for continuous mode control, it should be clear to one skilled in the art that any linear mode control function would be equally adaptable to this use. For example, this network might include integral control which is very desirable for accurate steady-state positioning. The output of the computer 32 is applied to a conventional power amplifier and converter 98 through conductor 99 and normally closed contacts 106 of the mode switch 35. The torque $T_c$ available at the output of converter 98 will be used to continuously drive any desired load within a small predetermined area about the origin of the phase plane portrait in which linear control is desired, and output shaft 101 of the continuous converter is directly connected to such a load.

In this embodiment the boundary control for mode switching is not that shown in the phase plane diagram of Fig. 1, but is a rectangle having a pair of parallel vertical sides 102 shown in the phase plane diagram of Fig. 9. This particular control boundary is chosen so that no error rate which will ever be encountered in the system will be sufficient to cause saturation torque operation, but the system will go into said saturation torque operation only upon a predetermined error being present in the system. This is accomplished by taking the A. C. modulated signal from the A. C. amplifier 84 and applying it directly to pentode 103. The control grid of pentode 103 is normally biased well below cut-off by the negative voltage of battery 104 which is in series with the output of the A. C. amplifier 84. Thus when no voltage is present at the output of the A. C. amplifier, tube 103 is not conducting and therefore no voltage is present across the relay coil 105. When this condition exists continuous mode torque computer 32 is connected through the normally closed contact 106 to drive the power amplifier and converter 98.

When the error voltage at the output of the A. C. amplifier reaches a predetermined magnitude sufficient to overcome the negative bias of battery 104, conduction begins in tube 103 and a voltage is applied to the coil 105 to actuate contact 106 to the open position and to close contacts 107. This will apply a saturation voltage as will be explained subsequently. This will be true irrespective of the sign of E and consequent phase of the error voltage. The mode computer pentode 103 has relay coil 105 and a filter condenser 108 connected in its anode circuit, and a voltage dividing network consisting of resistors 109 and 110, and condenser 111 to provide the customary screen voltage.

The output of the demodulator 85 also energizes the saturation torque polarity computer 36 through the balanced differentiating network 112, consisting of resistors 113 and 114 and condensers 115 and 116. As was explained with respect to the continuous mode torque computer, the proper choice of the relative values of these condensers and resistors will produce an output from this network which is equal to the error rate $\dot{E}$ which is the first derivative of the error E. This voltage is proportional to the error rate and is applied to a balanced D. C. amplifier consisting of the triodes 117 and 118 having common cathode resistor 130 which is connected to one side of an appropriate power supply. The output of this balance amplifier is applied through a voltage divider consisting of resistors 119 and 120 to a pair of semiconductors 121 and 122. These semiconductors have a nonlinear characteristic closely approaching a square law relationship over a limited range of applied voltages. By operating within this range, the output which is applied to resistor 123 will closely approximate the square of the input voltage to the semiconductors multiplied by an appropriate constant. This network, while deriving the square of the input, will still maintain the sign of the input and is thus represented by $\dot{E}|\dot{E}|$. This voltage, proportional to $\dot{E}|\dot{E}|$, is applied to the control grid of the vacuum tube 124 in a D. C. amplifier through voltage dividing resistors 125, 126, and 127 to ground. A voltage proportional to the error E is also present upon the control grid of tube 124 and is applied from the output of the demodulator 85 through conductors 128 and 129. These voltages arithmetically add in the summing network consisting of resistors 126 and 127 so that the voltage applied to the control grid of tube 124 is proportional to the function $k_1E+k_2\dot{E}|\dot{E}|$. By proper choice of the constants $k_1$ and $k_2$ as determined by resistors 126 and 127, this voltage will be proportional to the left side of Equation 3 which is a plot of the torque reversal curve 17 of the phase plane diagram of Figs. 1 and 9. Thus, as explained above, when this proportional voltage goes to zero the system is on the torque reversal curve, and by applying full opposite torque at such an instant the system will be reduced to zero error rate and error coincidently. Tube 124 is connected in the conventional manner, having resistor 131 and condenser 132 to provide cathode bias and network 133 to produce the desired screen grid potential.

Relay coil 134 is connected in the plate circuit of tube 124 and comprises the saturation torque polarity switch. Contacts 135, 136, 137, and 138 are all adapted to be actuated by the coil 134. When no voltage is present across coil 105, that is, when the system is within the mode boundary curve of Fig. 9, the system is in the continuous mode and thus no voltage is at that time being applied to the magnetic clutch 46. When the phase plane portrait leaves the area defined for continuous mode operation and assuming a positive error, relay coil 105 of mode switch 35 actuates contacts 107 and 139, and provides a voltage through actuated contacts 136 and contacts 107 to the power amplifier and converter 98 of the continuous mode apparatus such that the converter 98 will produce the maximum negative torque for which it was designed. At the same time contacts 139 are closed to apply a voltage through actuated contacts 138 to the control portions of the constant torque clutch 46 to produce the maximum negative torque of prime mover 47 determined by clutch 46.

A variety of clutches might be employed in dual mode apparatus, but the one herein disclosed is of the magnetic fluid type adapted to provide a bidirectional output. A prime mover drives shaft 141 continuously in a predetermined direction. This drives a pair of hollow shafts 142 and 143 in opposite directions through the bevel gear 144 and associated bevel gears 145 and 146. Shaft 142 continuously drives a magnetic armature 149 which is contained within the housing 147 of one magnetic fluid clutch 157. Housing 147 is filled with an oil having magnetic particles suspended therein, and upon energization of the actuating coil 148 the magnetic particles suspended in the fluid will be attracted between the soft iron discs of the armature 149 mounted for rotation with the shaft 142 and the magnetic housing 147. Thus, when the coil 148 is energized, there is a driving relationship between the magnetic discs of the armature 149 and the magnetic housing 147, and consequently the torque input of shaft 142 is transmitted to the shaft 152 to drive spur gear 153 which is in engagement with a second spur gear 154. Spur gear 154 is keyed to an output shaft 155 adapted to drive the load associated with the system. Shaft 155 of the clutch mechanism and shaft 101 of the continuous torque mechanism are adapted to provide aiding positive or negative torque when in the saturation torque mode.

The magnetic clutch 156 is driven in the opposite direction to clutch 157, already described, and is adapted to drive the output spur gear 153 in the opposite direction. Thus, when the system intersects the torque reversal curve, the direction of motion of the output shaft 155 is suddenly reversed. Contacts 138, which are actuated before intersection with the torque reversal curve, will energize coil 148 through conductor 161 and provide negative torque at the output shaft 155. To provide torque reversal upon intersection with the torque reversal curve, contacts 138 are opened and contacts 137 closed. Contacts 136 are also opened and contacts 135 closed to reverse the full torque of the continuous mode converter 98. The opening of contacts 138 deenergizes coil 148 and the closing of contacts 137 energizes the coil 158 of the second magnetic fluid clutch 156 through conductor 162. This will produce a maximum output torque in the opposite or positive direction and will cause the servo load to follow the torque reversal curve to the origin.

While in the drawing the continuous mode torque amplifier and converter 98 are shown energized by a fixed voltage, B+, when the system is approaching the origin along the torque reversal curve 17, greater stability and accuracy can be attained by using the continuous mode converter to maintain the system trajectory in closer correlation with the torque reversal curve 17. This can be accomplished by a rather simple circuit change involving no additional apparatus. The output of the saturation torque polarity computer 36 is substituted for the B+ voltage at switch contacts 135 in the torque polarity switch 45. This voltage, of course, is zero when the system is on the torque reversal curve and will have a positive value above the curve, and a negative value below the curve. Therefore, if the system, while approaching the origin driven by the saturation torque prime mover, departs from the predetermined trajectory, the continuous mode converter will apply a correcting torque which will tend to maintain the trajectory on the torque reversal curve, as desired.

Coil 105 is designed to have a substantial hysteresis and thus the system will not revert to the continuous mode of operation when the system falls within the boundaries 102 of Fig. 9. Instead, a second boundary 159 is established as determined by the magnitude of the hysteresis, and when the phase plane trajectory of the system intersects this second boundary, the current in coil 105 will have been reduced to the point where contacts 107 will be opened to remove the saturation torque voltage from the power amplifier and converter 98, and contacts 139 opened to remove the voltage from coil 158 of the constant torque clutch 156. Contacts 106 will again be closed to apply the output of the continuous mode torque computer 32 to the power amplifier and converter 98 through conductors 99.

A brief résumé of the operation of this circuit will be helpful in establishing an over-all picture of its operation. An error signal is fed to a mode computer, a saturation torque polarity computer, and a continuous mode torque computer, through an A. C. amplifier and demodulator. When the system is in substantial positional agreement, the output of the linear mode torque computer controls the system load and maintains accurate positional agreement. When, as a result of sudden changes in the input or transient forces on the output, positional agreement is suddenly destroyed, the mode computer is energized by the error voltage and actuates the mode switch to remove the output of the linear mode torque computer from the power amplifier 98. At the same time, the maximum torque for which the system is designed is applied to remove the large error through the clutch mechanism 46. This torque produces a maximum acceleration tending to correct the error, and the saturation torque polarity computer determines the point at which this maximum torque should be reversed in order to accelerate the system to produce error and error rate agreement coincidently. When the system is following this torque reversal curve, it approaches the origin and the mode computer once again switches back to the linear mode of operation, utilizing the output of the continuous mode torque computer 32. While the system has been explained for a step-function of positive error rate, it will be understood that the system will respond to all errors or error rates, either positive or negative, as shown on the phase plane diagram of Fig. 9.

While Fig. 5 describes the use of two prime movers, a low power motor 44, and a high power motor 47 in cooperation with a constant torque clutch 46, it should be clear that the motor could be bidirectional and normally at rest whereby the clutch control and clutch could be eliminated. The output of the saturation torque polarity computer could directly control the prime mover 47, or could preferably be used to energize a solenoid switch which would control the power to the prime mover 47.

It is intended that the various systems herein described could be controlled in accordance with a predetermined function of the error, derivatives of the error, integrals of the error, or any conceivable combination of two or more of these functions. This combination of functions is referred to in the art and with respect to this invention as an integro-differential function.

Thus a system and method of position control is taught which will provide optimum control for both near steady-state and transient conditions. This system overcomes the usual difficulties of maintaining near steady-state agreement normally encountered in the contactor type of servos, and also eliminates the usual problems encountered in linear type of servos which arise from poor response time and consequent poor tracking.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In a position control system having a controlling element, a controlled element, and means for positioning said controlled element, means for energizing said positioning means as an increasing non-linear discontinuous function of the position of said controlling element relative to said controlled element whereby increases in said discontinuous function produce increasing energy from said positioning means.

2. In a position control system, a controlling element, a controlled element, means for positioning said controlled element, and means for energizing said positioning means as an integro-differential function of the position of said controlling element relative to said controlled element for small variations in relative position less than a predetermined magnitude and to apply the maximum force of said positioning means when said variations reach said predetermined magnitude.

3. In a closed cycle control system for maintaining the relative positions of two rotatable shafts, a first shaft rotatable in a controllable pattern, a second rotatable shaft, means for rotating said second shaft, means for comparing the positional and dynamic relationships of said first and second shafts, and means actuated by said comparing means to control said driving means in two modes, the first mode adapted to control the torque of said driving means as a function of said positional and dynamic relationships within certain predetermined ranges of said relationships and the second of said modes adapted to apply the maximum available torque of said driving means when said relationships are not within said predetermined ranges.

4. In a closed cycle control system for maintaining the relative positions of two rotatable shafts, a first shaft rotatable in an arbitrary pattern, a second rotatable shaft, means for rotating said second shaft, means for comparing the relative positions of said first and second shafts, computing means for performing mathematical operations on the output of said comparing means to generate a function of the position and rate of change of position of said input relative to said output, and means responsive to the output of said computing means to control said rotating means in two operating modes, the first of said modes for magnitudes of said function less than a predetermined maximum controlling said driving means as an integro-differential function of the relative position and rate of change of position of said shafts and the second of said modes for magnitudes of said function greater than said predetermined maximum applying the maximum available torque of said rotating means to said second shaft.

5. In a closed cycle control system, a controlling element, a controlled element, means for energizing said controlled element, and means for controlling said energizing means in two operating modes, the first of said modes applying the energy of said energizing means as an integro-differential function of the positional variation between the controlling element and the controlled element for values of a second function less than a predetermined magnitude, and the second of said modes applying the maximum available force of said energizing means when said second function exceeds said predetermined magnitude.

6. A method of position control comprising sensing the positional difference between a positioning signal source and a device to be positioned, establishing a voltage proportional to said difference, automatically performing a series of mathematical operations upon said voltage to yield first and second voltages equal to predetermined integro-differential functions of the positional difference, and applying the first of said voltages to a driving means for said device to produce a force proportional to the first of said functions within a predetermined range of values of the second of said functions and to produce the maximum force of said means for all values of the second of said functions not within said predetermined range.

7. A method of position control comprising sensing the angular difference between a rotatable position-controlling shaft and a rotatable controlled shaft to be positioned, establishing an error voltage proportional to said difference, automatically performing a series of mathematical operations to yield a control voltage equal to a predetermined integro-differential function of said angular difference, applying said error voltage to a driving means for said controlled shaft to produce a torque proportional to a linear integro-differential function of said error voltage, and switching to a voltage for said driving means to derive the maximum torque of said driving means when said control voltage reaches a predetermined value.

8. A method of position control comprising sensing the angular difference between a rotatable positioning signal shaft and a rotatable controlled shaft to be positioned, deriving a voltage which is a first integro-differential function of said difference, and applying a voltage which is a linear integro-differential function of said difference to a driving means for said output shaft to produce a torque proportional to said linear function of said difference within a predetermined range of values of said first function and to produce the maximum torque of said driving means for values of said first function not within said range.

9. A method of position control comprising the steps of continuously sensing the angular difference between a rotatable positioning signal shaft and a rotatable controlled shaft to be positioned, deriving a control voltage which is a function of said difference and the rate of change of said difference, and utilizing said control voltage to cause said controlled shaft to be energized by a linear torque source for values of said function within a predetermined magnitude and an off-on torque source for values of said function above said predetermined magnitude.

10. A method of position control comprising sensing the angular difference between a rotatable controlling shaft and a rotatable controlled shaft, establishing a voltage proportional to said difference, automatically performing a series of mathematical operations to yield a voltage equal to a predetermined integro-differential function of said angular difference, automatically selecting one of two driving modes for said controlled shaft as determined by said function whereby a linear driving force is applied for values of said function less than a predetermined magnitude and a constant force of a magnitude substantially in excess of the maximum force of said linear driving force is applied for values of said function in excess of said predetermined magnitude, and automatically reversing said constant force when said voltage equal to a predetermined integro-differential function is of such a magnitude that a constant braking force will cause said controlled and controlling shafts to assume positional and rate of change of position agreement coincidently.

11. A method of position control comprising sensing the angular difference between a rotatable controlling shaft and a rotatable controlled shaft, establishing a voltage proportional to said difference, automatically performing a series of mathematical operations to yield a voltage equal to a predetermined integro-differential function of said angular difference, automatically selecting one of two driving modes for said controlled shaft as determined by said function whereby a linear driving force is applied for values of said voltage less than a predetermined magnitude and a constant force of a magnitude substantially in excess of the maximum force of said linear driving force is applied for values of said function in excess of said predetermined magnitude, and automatically reversing said constant force when said voltage equal to a predetermined function is of such a magnitude that a constant braking force will cause said controlled and controlling shafts to assume positional and rate of change of position agreement coincidently.

12. A method of position control comprising sensing the positional difference between a controlling element and a controlled element, establishing a voltage proportional to said difference, automatically performing a series of mathematical operations to yield a voltage equal to a predetermined integro-differential function of said difference, automatically selecting one of two driving modes for said controlled element as determined by said function whereby a linear driving force is applied for values of said voltage less than a predetermined magnitude and a constant force of a magnitude substantially in excess of the maximum force of said linear driving force is applied for values of said voltage in excess of said predetermined magnitude, and automatically reversing said constant force when said voltage equal to a predetermined function is of such a magnitude that a constant braking force will cause said controlled and controlling elements to assume positional and rate of change of position agreement coincidently.

13. In a position control system having a controlling element, a controlled element, and means for driving said controlled element, first means for normally energizing said driving means as an integro-differential function of the positional difference between such a controlled element and such a controlling element, a second means for energizing said driving means to produce its maximum force, boundary control means to generate a voltage which is a second integro-differential function of said positional difference and the rate of change of said positional difference, and switch means responsive to said boundary control means to apply said second energizing means and remove said first energizing means when said voltage is of a predetermined magnitude.

14. In a position control system having a controlling element, a controlled element, and means for driving said controlled element, first means for normally energizing said driving means as an integro-differential function of the positional difference between such a controlled element and such a controlling element, a second means for energizing said driving means to produce its maximum force, boundary control means to generate a voltage which is a second integro-differential function of said positional difference and the rate of change of said positional difference, switch means responsive to said boundary control means to apply said second energizing means and remove said first energizing means when said voltage is of a predetermined magnitude, and second switch means to reverse the direction of said second energizing means when the positional difference and rate of change of positional difference are such that the reversed maximum force of said driving means will cause such a controlled element and controlling element to be in positional and rate of change of position agreement substantially coincidently.

15. In a position control system having a controlling element, a controlled element, and means for driving said controlled element, first means for normally energizing said driving means as an integro-differential function of the positional difference between such a controlled element and such a controlling element, a second means for energizing said driving means to produce its maximum force, boundary control means to generate a voltage which is proportional to a second integro-differential function of said positional difference, switch means responsive to said boundary control means to apply said second energizing means and remove said first energizing means when said voltage is of a predetermined magnitude, reversal control means to generate a voltage which is an integro-differential function of the positional difference and the rate of change of said positional difference, and second switch means to reverse the direction of said second energizing means and remove said first energizing means when means is such that the reversed maximum force of said driving means will cause such a controlled element and controlling element to assume positional and rate of change of position agreement substantially coincidently.

16. In a position control system having a controlling element, a controlled element, and means for positioning said controlled element, means for energizing said positioning means as an integro-differential function of the position of said controlling element relative to said controlled element for variations in said relative position less than a predetermined magnitude, and switch means to apply the maximum force of said positioning means when said variations reach said predetermined magnitude.

17. In a position control system having a controlling element, a controlled element, and means for positioning said controlled element, non-linear control means responsive to positional deviation between such a controlled element and such a controlling element to energize the positioning means to produce a force substantially proportional to a linear integro-differential function of the deviation for variations of said deviation less than a predetermined magnitude and to apply a relatively large force to said controlled element when said variation exceeds said predetermined magnitude, and reversing means to apply said large force in the reverse direction at a time determined by said reversing means such that such a controlled element and controlling element will assume substantially identical positions and rate of change of position coincidently.

18. In a position control system, a controlling element, a controlled element, first means for driving said controlled element as an integro-differential function of a positional difference between said controlled element and said controlling element, second means for driving said controlled element to produce a force larger than the maximum force of said first means, and means for switching from said first means to said second means when an integro-differential boundary function of said positional difference reaches a predetermined magnitude.

19. In a position control system, a controlling element, a controlled element, first means for driving said controlled element as an integro-differential function of a positional difference between said controlled element and said controlling element, second means for driving said controlled element to produce a force larger than the maximum force of said first means, means for switching from said first means to said second means when a second integro-differential function of said positional difference reaches a predetermined magnitude, and force reversing means for computing the relationship of the positional difference and the rate of change of such a positional difference and causing the force of said second driving means to be applied to the controlled element to effect positional and rate of change of position agreement substantially coincidently.

20. In a position control system, a controlling element, a controlled element, hydraulic means for positioning said controlled element, first valve means for energizing said hydraulic means as a linear integro-differential function of the positional displacement of said controlled element from said controlling element, second valve means for applying the full hydraulic pressure to said hydraulic means to effect maximum motion of said controlled element, and computer means to operate said first valve means for values of an integro-differential boundary function of said positional displacement less than a predetermined magnitude and to operate said second valve means for values of said function in excess of said predetermined magnitude.

21. In a position control system, a controlling element, a controlled element, hydraulic means for positioning said controlled element, first valve means for energizing said hydraulic means as a linear integro-differential function of the positional displacement of said controlled element from said controlling element, second valve means for applying the full hydraulic pressure to said hydraulic means to effect maximum motion of said controlled element, computer means to utilize said first valve means for values of an integro-differential boundary function of said positional displacement less than a predetermined magnitude and to operate said second valve means for values of said boundary function in excess of said predetermined magnitude, and second computer means to reverse said second valve means to force said controlled element and controlling element to assume positional and rate of change of position agreement substantially coincidently.

22. In a position control system, a controlling element, a controlled element, low power driving means for said controlled element, linear computer means for energizing said low power means as an integro-differential function of the positional displacement of said controlled element from said controlling element, continuously rotating high power means, clutch means to drivingly engage said controlled element and said high power means, and computer means to actuate said clutch means when an integro-differential boundary function of the positional displacement reaches a predetermined magnitude and to reverse the direction of applied power to cause the positional displacement and the rate of change of positional displacement to be reduced to zero simultaneously.

23. In a position control system, a controlling element, a controlled element, low power driving means for said controlled element, linear computer means for energizing said low power means as an integro-differential function of the positional displacement of said controlled element from said controlling element, continuously rotating high power means, constant force clutch means to drivingly engage said controlled element and said high power means, and computer means to actuate said clutch means when an integro-differential boundary function of the positional displacement reaches a predetermined magnitude and to reverse the direction of applied power to cause the positional displacement and the rate of change of positional displacement to be reduced to zero simultaneously.

24. In a position control system, a controlling shaft, a controlled shaft, low torque driving means for said controlled shaft, computer means for energizing said low torque means as an integro-differential function of the positional displacement of said controlled shaft from said controlling shaft, continuously rotating high torque means, constant torque clutch means to drivingly engage said controlled shaft and said high torque means, and computer means to actuate said clutch means when an integro-differential boundary function of the positional displacement reaches a predetermined magnitude and to reverse the direction of applied torque to cause the positional displacement and the rate of change of positional displacement to be reduced to zero simultaneously.

25. In a position control system, a controlling element, a controlled element, low torque driving means for said controlled element, linear computer means for energizing said low torque means as an integro-differential function of the positional displacement of said controlled element from said controlling element, continuously rotating high torque means, constant torque clutch means to drivingly engage said controlled element and said high torque means, computer means to actuate said clutch means when an integro-differential boundary function of the positional displacement reaches a predetermined magnitude, and second computer means to reverse the direction of applied torque of said high torque means when a torque reversal integro-differential function of said positional displacement is of a magnitude such that the high torque means will reduce the positional displacement and the rate of change of positional displacement to zero substantially simultaneously.

26. In a position control system, a controlling element, a controlled element, low torque driving means for said controlled element, linear computer means for energizing said low torque means as an integro-differential function of the positional displacement of said controlled element from said controlling element, continuously rotating high torque means, constant torque clutch means to drivingly engage said controlled element and said high torque means, boundary computer means to actuate said clutch means when an integro-differential boundary function of the positional displacement reaches a predetermined magnitude, reversal computer means to reverse the direction of applied torque of said high torque means when a reversal integro-differential function of said positional displacement is of a magnitude such that the high torque means will reduce the positional displacement and the rate of change of positional displacement to zero substantially simultaneously, and switch means to disengage said clutch means when said positional displacement and rate of change of positional displacement approach zero.

27. In a position control system, a linear servomechanism, a contactor servomechanism, and computer means to utilize said linear servomechanism for small values of an integro-differential function of displacement and to switch to said contactor servomechanism for values of said function greater than a predetermined magnitude.

28. In a position control system, a controlling element, a controlled element, low power driving means for said controlled element, linear computer means for energizing said low power means as an integro-differential function of the positional displacement of said controlled element from said controlling element, high power driving means, and computer means to energize said high power means when an integro-differential boundary function of the positional displacement reaches a predetermined magnitude and to reverse the direction of applied power to cause the positional displacement and rate of change of positional displacement to be reduced to zero simultaneously.

29. In a position control system having a controlling element, a controlled element and means for positioning said controlled element, measuring means to sense a positional difference between said controlling and controlled elements, means for applying the maximum power of said positioning means to eliminate such a positional difference in response to said measuring means, and switch means to reverse the positioning means and apply maximum power at a predetermined time to reduce such positional difference and the rate of change of such positional difference to substantially zero coincidently.

30. In a position control system having a controlling element, a controlled element and means for positioning said controlled element, measuring means to sense a positional difference between said controlling and controlled elements, computer means for determining the characteristic motion of the controlled element, means for applying the maximum power of said positioning means to eliminate such a positional difference in response to said measuring means, and switch means responsive to said measuring means and said computer means to effect reversal of said maximum power to reduce such positional difference and the rate of change of such positional difference to substantially zero coincidently.

31. In a position control system having a controlling element and a controlled element, means to sense a positional difference between said controlled and controlling elements, means for applying a fixed predetermined power source to said controlled element to eliminate such a positional difference in response to said sensing means, and means to reverse said source and apply the fixed predetermined power source to oppose the motion of said controlled element at a predetermined time to reduce such positional difference and the rate of change of such positional difference to substantially zero coincidently.

32. In a position control system having a controlling element, a controlled element and means for positioning said controlled element, measuring means to sense a positional difference between said controlling and controlled elements, means for applying the maximum power of said positioning means to eliminate such a positional difference in response to said measuring means, and switch means to reverse the positioning means and apply maximum power at a predetermined time to reduce such positional difference and the rate of change of such positional difference within predetermined ranges including the zero values coincidently, and means to apply a portion of the power of said positioning means to said controlling element varying in accordance with said positional difference whenever said positional difference and rate of change of positional difference are within said ranges.

33. In a position control system having a controlling element, a controlled element and means for positioning said controlled element, measuring means to sense a positional difference between said controlling and controlled elements, means for applying the maximum power of said positioning means to eliminate such a positional difference in response to said measuring means, and switch means to reverse the positioning means and apply maximum power at a predetermined time to reduce such positional difference and the rate of change of such positional difference within predetermined ranges including the zero values coincidently, and means to apply the power of said positioning means to said controlled element as an integro-differential function of said positional difference whenever said positional difference and rate of change of positional difference are within said ranges.

References Cited in the file of this patent

UNITED STATES PATENTS

| | | |
|---|---|---|
| 2,408,070 | Hull et al. | Sept. 24, 1946 |
| 2,577,650 | Davis | Dec. 4, 1951 |
| 2,654,999 | Berge | Oct. 13, 1953 |
| 2,663,832 | McDonald | Dec. 22, 1953 |